US012393507B2

(12) United States Patent
Hu

(10) Patent No.: US 12,393,507 B2
(45) Date of Patent: Aug. 19, 2025

(54) METHOD AND CLUSTER FOR TESTING ORCHESTRATION

(71) Applicant: AMERICAN MEGATRENDS INTERNATIONAL, LLC, Duluth, GA (US)

(72) Inventor: Chih-Kai Hu, Taipei (TW)

(73) Assignee: AMERICAN MEGATRENDS INTERNATIONAL, LLC, Duluth, GA (US)

( * ) Notice: Subject to any disclaimer, the term of this patent is extended or adjusted under 35 U.S.C. 154(b) by 55 days.

(21) Appl. No.: 18/129,924

(22) Filed: Apr. 3, 2023

(65) Prior Publication Data

US 2024/0330164 A1 Oct. 3, 2024

(51) Int. Cl.
*G06F 11/3668* (2025.01)
*G06F 9/54* (2006.01)
*G06F 11/3698* (2025.01)

(52) U.S. Cl.
CPC .......... *G06F 11/3688* (2013.01); *G06F 9/547* (2013.01); *G06F 11/3698* (2025.01)

(58) Field of Classification Search
CPC ... G06F 11/3664; G06F 11/3688; G06F 9/547
See application file for complete search history.

(56) References Cited

U.S. PATENT DOCUMENTS

| 10,796,035 | B1* | 10/2020 | Xia | G06F 30/18 |
|---|---|---|---|---|
| 2018/0336123 | A1* | 11/2018 | Benes | G06F 11/3692 |
| 2021/0200814 | A1* | 7/2021 | Tal | G06F 16/90335 |
| 2022/0060398 | A1* | 2/2022 | Shishir | H04L 43/08 |
| 2023/0105203 | A1* | 4/2023 | Reeve | G06F 11/3409 714/38.1 |
| 2023/0297390 | A1* | 9/2023 | Hung | G06F 9/4401 713/2 |
| 2024/0045795 | A1* | 2/2024 | Kumar | G06F 11/3664 |

* cited by examiner

*Primary Examiner* — Jigar P Patel

(57) ABSTRACT

A method and a cluster for testing orchestration are provided. The method comprises: assigning a plurality of testing containers each including a specification file to provide testing details and stored in a repository of a control plane, by a testing controller of the control plane, to a plurality of pods each including at least one storage volume configured to store the assigned testing containers; dispatching the plurality of pods, by a scheduler of the control plane through an application program interface (API) server of the control plane, to at least one node; running the plurality of pods, by the at least one node, to execute the assigned testing containers, until all the assigned testing containers stored in the at least one storage volume have been finished; reporting execution results of the finished testing containers to the API server; and if any execution result indicates a failure, assigning the corresponding testing container again to a different pod.

12 Claims, 5 Drawing Sheets

METHOD AND CLUSTER FOR TESTING ORCHESTRATION

FIELD OF INVENTION

The present invention relates to baseboard management controller (BMC) image testing, and more particularly to a method and a cluster for orchestration of BMC image testing.

BACKGROUND

To implement platform management for server-class computer systems, baseboard management controllers (BMCs) are typically included. A BMC is a specialized microcontroller embedded on the motherboard of a computer, which manages the interface between the system management software and the platform hardware. In line with significant and rapid advances in the area of server management, the BMC introduces various hardware and software services that require numerous and frequent image revisions and updates.

By convention, testing of BMC image builds is carried out using a single hardware entity. For test cycles where thousands of test passes are run, it may take several days to get results; moreover, erratic environment issues (operating system behavior, temperature, humidity, power supply voltage, fan speed, etc.) often cause failures that are difficult to duplicate, greatly hindering development processes. A solution to improve testing throughput and reproducibility is therefore needed.

SUMMARY

One objective of the present invention is to provide a method and a cluster for testing orchestration, which can run large numbers of test passes in parallel, thereby speeding up test cycles.

Another objective of the present invention is to provide a method and a cluster for testing orchestration, which facilitate verification and analysis of failures by repeating test passes using different software and/or hardware entities, thereby enhancing testing efficiency.

In a first embodiment of the present invention, a method for testing orchestration comprises: assigning a plurality of testing containers each including a specification file to provide testing details and stored in a repository of a control plane, by a testing controller of the control plane, to a plurality of pods each including at least one storage volume configured to store the assigned testing containers; dispatching the plurality of pods, by a scheduler of the control plane through an application program interface (API) server of the control plane, to at least one node; running the plurality of pods, by the at least one node, to execute the assigned testing containers, until all the assigned testing containers stored in the at least one storage volume have been finished; reporting execution results of the finished testing containers to the API server, and if any execution result indicates a failure, assigning the corresponding testing container again to a different pod.

In one aspect of the first embodiment, the assigning a plurality of testing containers is based on user selection.

In one aspect of the first embodiment, the repository functions as a version control system.

In one aspect of the first embodiment, each of the plurality of testing containers includes a virtual firmware configured to simulate a baseboard management controller (BMC), and the specification file includes a BMC image.

In one aspect of the first embodiment, the pod being assigned the testing container corresponding to the failure-indicating execution result is dispatched to a different node.

In one aspect of the first embodiment, if the failure is confirmed, the corresponding testing container is not assigned again.

In a second embodiment of the present invention, a cluster for testing orchestration comprises: a control plane and at least one node, the control plane comprising: a repository storing a plurality of testing containers each including a specification file to provide testing details; a testing controller configured for assigning the plurality of testing containers to a plurality of pods each including at least one storage volume configured to store the assigned testing containers, and assigning any testing container corresponding to a failure-indicating execution result to a different pod; a scheduler configured for dispatching the plurality of pods; and an application program interface (API) server through which the plurality of pods is dispatched to the at least one node. The at least one node is configured for running the plurality of pods to execute the assigned testing containers, until all the assigned testing containers stored in the at least one storage volume have been finished, and reporting execution results of the finished testing containers to the API server.

In one aspect of the second embodiment, the repository functions as a version control system.

In one aspect of the second embodiment, each of the plurality of testing containers includes a virtual firmware configured to simulate a baseboard management controller (BMC), and the specification file includes a BMC image.

In one aspect of the second embodiment, the pod being assigned the testing container corresponding to the failure-indicating execution result is dispatched to a different node.

In one aspect of the second embodiment, the control plane is run across multiple control nodes.

In one aspect of the second embodiment, the cluster further comprises a load balancer between the control plane and the at least one node.

DETAILED DESCRIPTION

Embodiments of the present invention are set forth below in connection with the appended drawings, for the purpose of providing a thorough understanding of various concepts while not intended to represent the only configurations in which the concepts described herein may be practiced. It will be apparent to those skilled in the art that these concepts may be practiced without these specific details. Well known structures and components are omitted in order to avoid obscuring such concepts.

Figure 1:
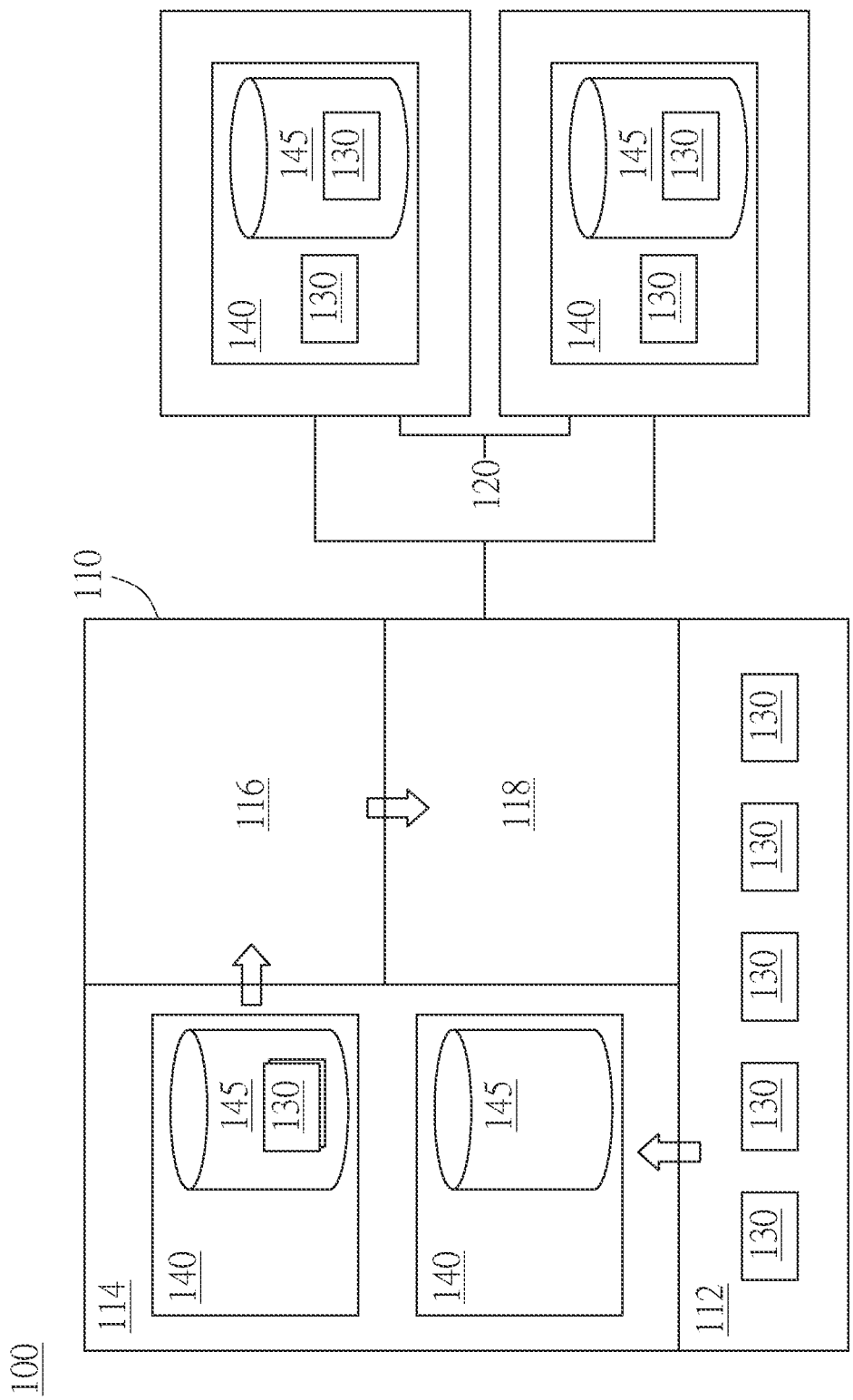
FIG. 1 is a logical block diagram of a cluster for testing orchestration according to one embodiment of the present invention.

FIG. 1 is a logical block diagram of a cluster for testing orchestration according to one embodiment of the present invention. The containerized cluster 100 may be created using existing orchestration software such as Kubernetes or Docker Swarm. As shown in FIG. 1, the cluster 100 comprises a control plane 110 and at least one node 120, the control plane 110 comprising a repository 112, a testing controller 114, a scheduler 116 and an application program interface (API) server 118. The repository 112 stores a plurality of testing containers 130, which are minimalistic virtual instances offering an environment for objects to be tested (in this case, BMC images); in an aspect, the repository 112 may function as a version control system for managing changes to the objects, implemented using software like Git, Subversion or Mercurial. To orchestrate test passes in the cluster 100, the testing containers 130 have to be assigned by the testing controller 114 to a plurality of pods 140, which are the basic scheduling units in in the cluster 100 and consist of one or more co-located testing containers; in an aspect, the assignment of the testing containers 130 may be based on user selection. Each of the pods 140 includes at least one storage volume 145 configured to store the assigned testing containers 130, as well as any other data to be shared within the pod. The scheduler 116 watches for the pods 140 having newly assigned testing containers, and dispatches these pods to the API server 118, which is the front end for the control plane 110 and in charge of communication with the at least one node 120. The at least one node 120 is configured for running the pods 140 to execute the assigned testing containers 130, until all the assigned testing containers 130 stored in the at least one storage volume 145 have been finished; execution results of the testing containers 130 are reported to the API server 118 for the control plane 110 to steer the overall test cycle. By scaling the numbers of the at least one node 120 and/or the pods 140, test cycles can be massively parallel, significantly reducing time consumption.

Figure 2:
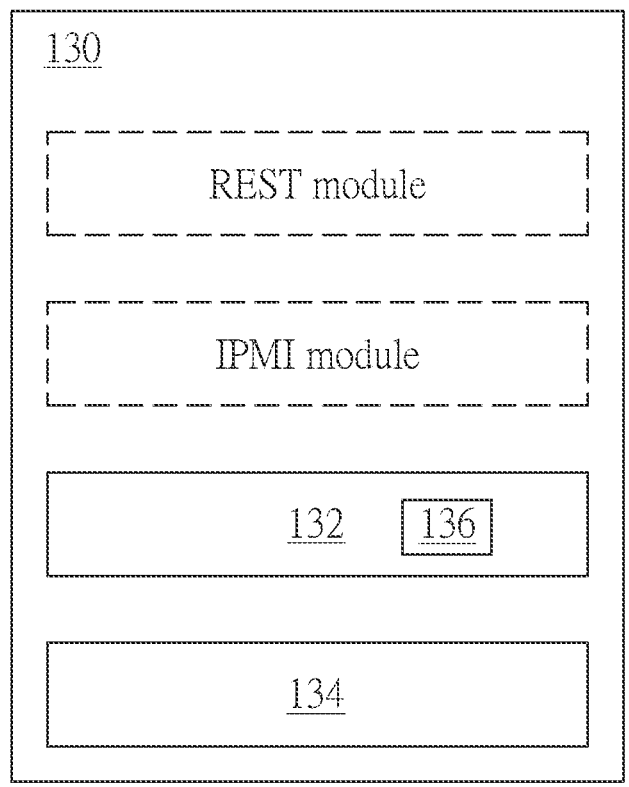
FIG. 2 is a block diagram of a testing container.

FIG. 2 is a block diagram of a testing container. As shown herein, the testing container 130 includes a specification file 132 to provide testing details. In an aspect, to realistically simulate a BMC, the testing container 130 may also include a virtual firmware 134, and the specification file 132 may include a BMC image 136. The specification file 132 may further include an Intelligent Platform Management Interface (IPMI) module and/or a Representational State Transfer (REST) module as needed, but the present invention is not limited hereto.

Figure 3:
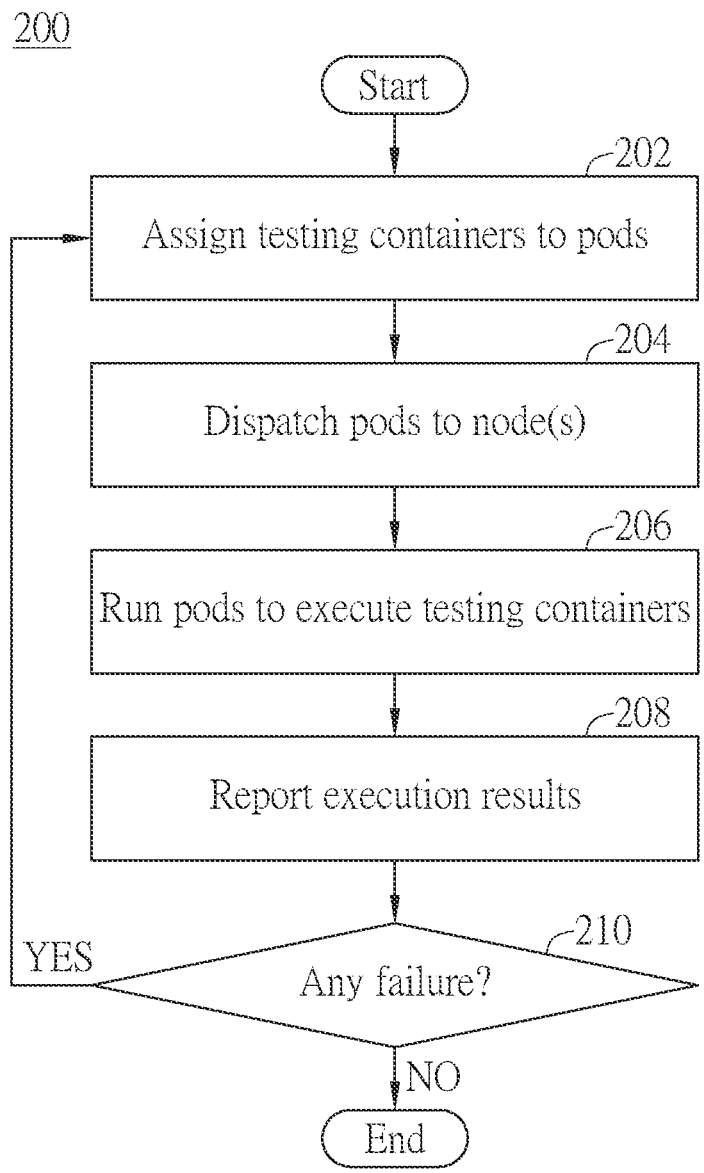
FIG. 3 is a flow chart of a method for testing orchestration according to one embodiment of the present invention.

FIG. 3 is a flow chart of a method for testing orchestration according to one embodiment of the present invention. The method 200 starts at step 202, where the testing controller 114 assigns a plurality of testing containers 130 stored in the repository 112 to a plurality of pods 140; the assigned testing containers 130 are in turn stored in the at least one storage volume 145. At step 204, the scheduler 116 dispatches the pods 140 to the at least one node 120. At step 206, the at least one node 120 runs the pods 140 to execute the assigned testing containers 130, until all the assigned testing containers 130 stored in the at least one storage volume 145 have been finished. At step 208, the at least one node 120 reports execution results of the testing containers 130 to the API server 118; the execution results are checked for failure(s) at decision 210. If any execution result indicates a failure, the corresponding testing container is returned to step 202, where it is assigned again to a different pod 140; otherwise, the method ends and the overall test cycle is completed. In an aspect, to rule out the influence of hardware environment, the pod 140 being assigned the testing container 130 corresponding to the failure-indicating execution result may be dispatched to a different node 120. In a further aspect, to avoid unnecessary repetition, the failure(s) may undergo a confirmation procedure at decision 210, and the corresponding testing container 130 is not assigned again if the failure is confirmed.

Figure 4:
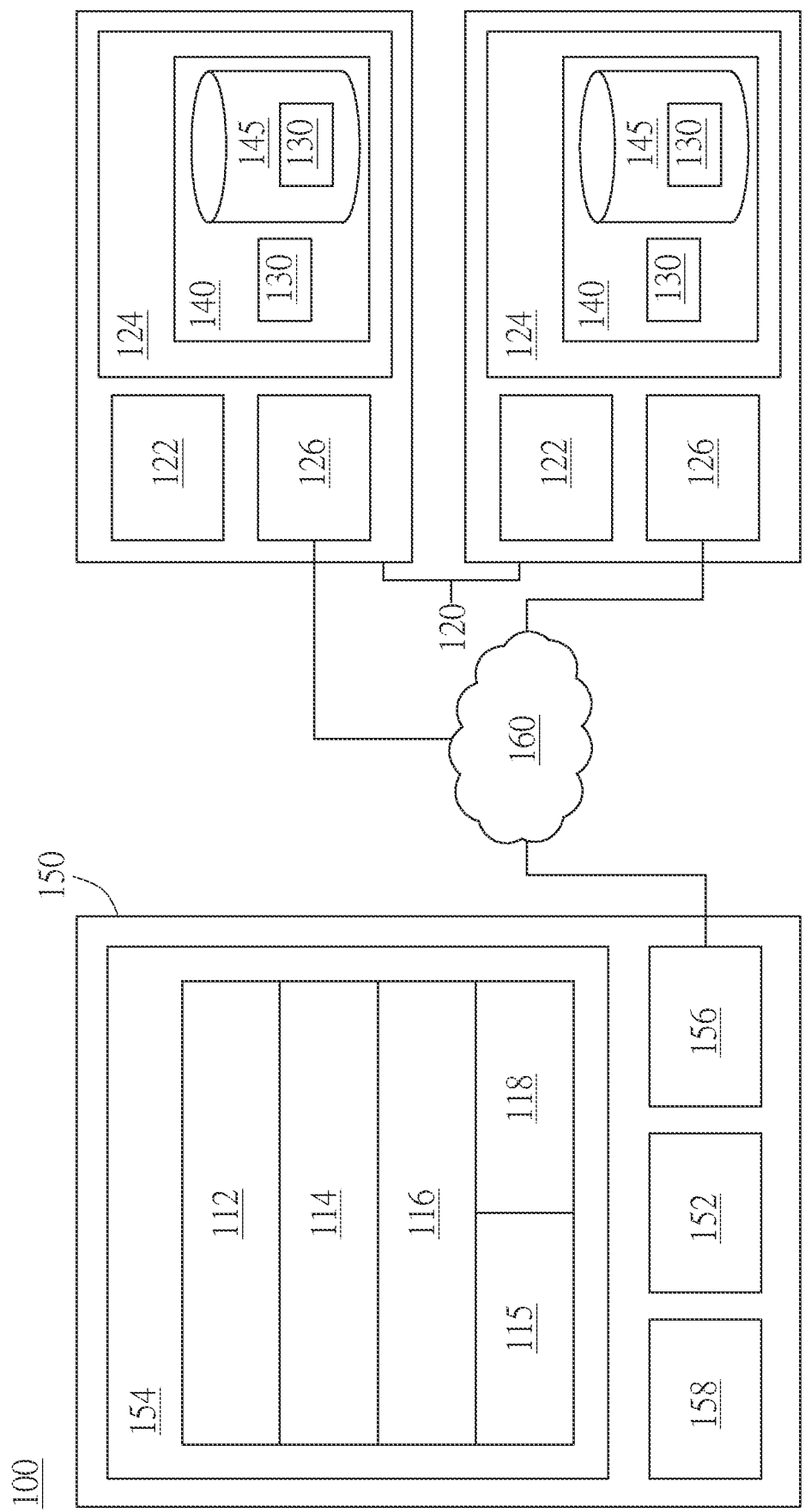
FIG. 4 is a physical block diagram of a cluster for testing orchestration according to one embodiment of the present invention.

FIG. 4 is a physical block diagram of a cluster for testing orchestration according to one embodiment of the present invention. For simplicity, the control plane 110 of the cluster 100 herein is shown to be run on a single control node 150. The at least one node 120 and the control node 150 include respectively processors 122 and 152, storage devices 124 and 154, as well as a network interface controllers (NICs) 126 and 156. The processor 122 is configured for running the repository 112, the testing controller 114, the scheduler 116 and the API server 118 residing in the storage device 124; analogously, the processor 152 is configured for running the pod(s) residing in the storage device 154. The NICs 126 and 156 are configured to communicatively connect the at least one node 120 and the control node 150 via an intranet 160. The control node 150 running the control plane 110 may further include a user interface (UI) 115 and an input/output (I/O) system 158 that collaborate to enable interaction with users for selection of and change to the testing containers 130, access to testing outcomes, etc.; the I/O system 158 may also provide connections with external networks such as the Internet.

Figure 5:
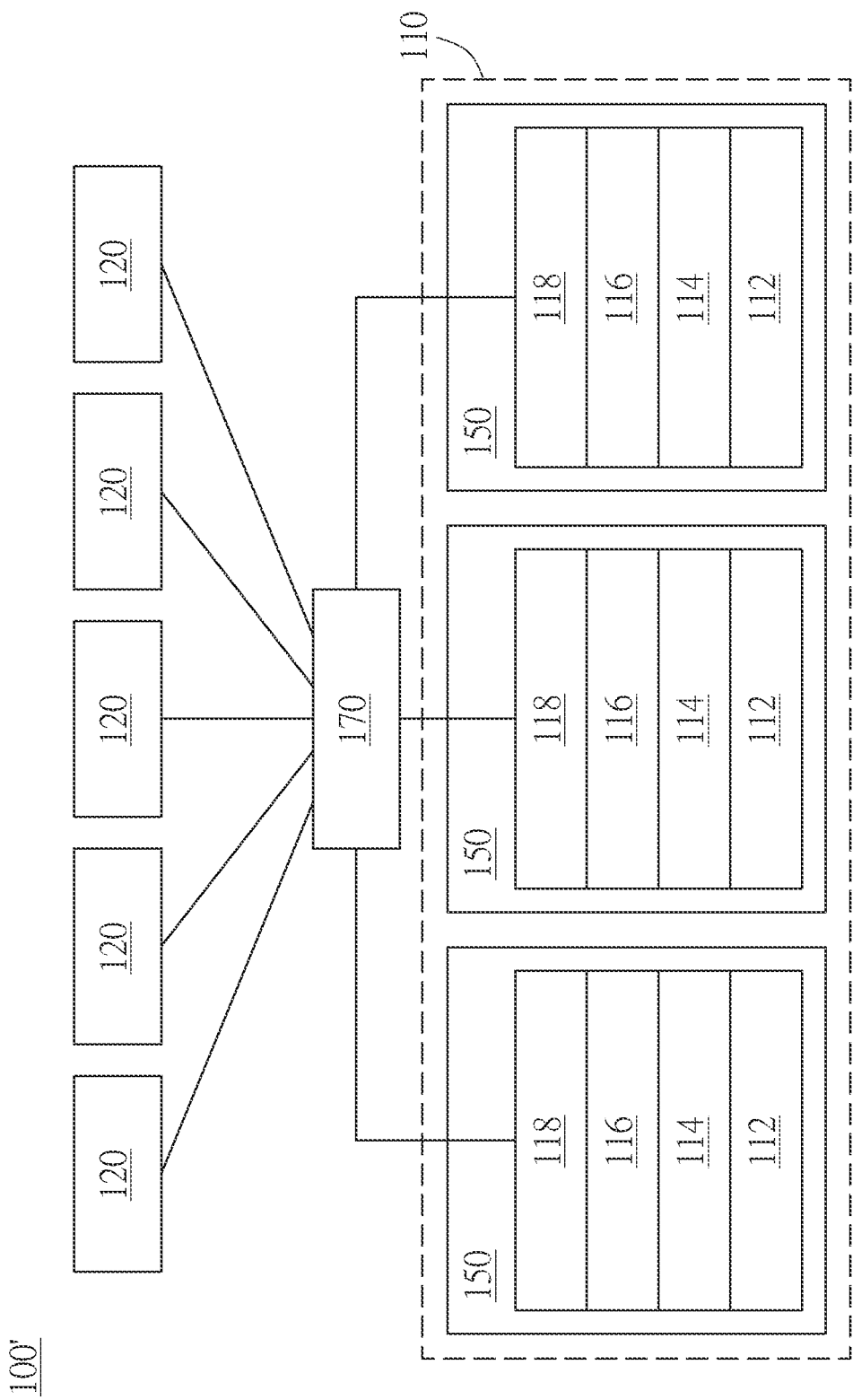
FIG. 5 is a logical block diagram of a cluster for testing orchestration according to another embodiment of the present invention.

In production setups where fault-tolerance and high availability are of importance, the control plane is usually run across multiple control nodes. As such, FIG. 5 is a logical block diagram of a cluster for testing orchestration according to another embodiment of the present invention. The repository 112 herein may be centralized in one control node or distributed across multiple control nodes, while instances of the testing controller 114, the scheduler 116 and the API server 118 are run by each of the control nodes 150. The cluster 100' having such a topology may further comprise a load balancer 170 between the control plane 110 and the at least one node 120 for coordination among the control nodes 150.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The foregoing description is provided to enable any person skilled in the art to practice the various aspects described herein, and is not intended to be exhaustive or to limit the present invention to the precise forms disclosed. Various modifications to these aspects will be readily apparent to those skilled in the art, and the generic principles defined herein may be applied to other aspects. Accordingly, the scope of the present invention is to be accorded the broadest scope consistent with the appended claims rather than the foregoing description and the exemplary embodiments described therein.

What is claimed is:

1. A method for testing orchestration, comprising:
 assigning a plurality of testing containers each including a specification file to provide testing details and stored in a repository of a control plane, by a testing controller of the control plane, to a plurality of pods each including at least one storage volume configured to store the assigned testing containers, wherein the specification file includes a baseboard management controller (BMC) image;

dispatching the plurality of pods, by a scheduler of the control plane through an application program interface (API) server of the control plane, to at least one node;

running the plurality of pods, by the at least one node, to execute the assigned testing containers, until all the assigned testing containers stored in the at least one storage volume have been finished;

reporting execution results of the finished testing containers to the API server; and assigning any testing container corresponding to a failure-indicating execution result to a different pod.

2. The method of claim 1, wherein the assigning a plurality of testing containers is based on user selection.

3. The method of claim 1, wherein the repository functions as a version control system.

4. The method of claim 1, wherein each of the plurality of testing containers includes a virtual firmware configured to simulate a BMC.

5. The method of claim 1, wherein the pod being assigned the testing container corresponding to the failure-indicating execution result is dispatched to a different node.

6. The method of claim 1, wherein if the failure is confirmed, the corresponding testing container is not assigned again.

7. A cluster for testing orchestration, comprising:
a control plane and at least one node, the control plane comprising:

a repository storing a plurality of testing containers each including a specification file to provide testing details, wherein the specification file includes a baseboard management controller (BMC) image;

a testing controller configured for assigning the plurality of testing containers to a plurality of pods each including at least one storage volume configured to store the assigned testing containers, and assigning any testing container corresponding to a failure-indicating execution result to a different pod;

a scheduler configured for dispatching the plurality of pods; and an application program interface (API) server through which the plurality of pods is dispatched to the at least one node, the at least one node being configured for running the plurality of pods to execute the assigned testing containers, until all the assigned testing containers stored in the at least one storage volume have been finished, and reporting execution results of the finished testing containers to the API server.

8. The cluster of claim 7, wherein the repository functions as a version control system.

9. The cluster of claim 7, wherein each of the plurality of testing containers includes a virtual firmware configured to simulate a BMC.

10. The cluster of claim 7, wherein the pod being assigned the testing container corresponding to the failure-indicating execution result is dispatched to a different node.

11. The cluster of claim 7, wherein the control plane is run across multiple control nodes.

12. The cluster of claim 11, further comprising a load balancer between the control plane and the at least one node.

* * * * *